(12) United States Patent
Simmons et al.

(10) Patent No.: US 8,860,686 B2
(45) Date of Patent: Oct. 14, 2014

(54) MULTI-CHIP TOUCH SCREENS

(75) Inventors: Martin John Simmons, Fareham (GB); Dan Thomas Edward Pickett, Fareham (GB); Richard Paul Collins, Fareham (GB)

(73) Assignee: Atmel Corporation, San Jose, CA (US)

( * ) Notice: Subject to any disclaimer, the term of this patent is extended or adjusted under 35 U.S.C. 154(b) by 344 days.

(21) Appl. No.: 12/771,583

(22) Filed: Apr. 30, 2010

(65) Prior Publication Data

US 2011/0267304 A1 Nov. 3, 2011

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04101* (2013.01)
USPC ........... 345/174; 345/173; 345/175; 345/176; 345/177; 345/178; 345/179; 178/18.06; 178/18.05; 178/18.03; 324/658; 324/661

(58) Field of Classification Search
USPC ................ 345/156–179; 178/18.01, 19.06, 178/18.03–18.06; 463/37–38; 324/658, 661
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen et al. | 178/18.07 |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling et al. | 345/173 |
| 8,049,732 B2 | 11/2011 | Hotelling | |
| 8,179,381 B2 | 5/2012 | Frey et al. | 345/174 |
| 2004/0135775 A1* | 7/2004 | Hurst et al. | 345/179 |
| 2007/0200833 A1* | 8/2007 | Park et al. | 345/173 |
| 2009/0250268 A1* | 10/2009 | Staton et al. | 178/18.06 |
| 2009/0267903 A1* | 10/2009 | Cady et al. | 345/173 |
| 2009/0315854 A1 | 12/2009 | Matsuo | 345/174 |
| 2010/0156811 A1* | 6/2010 | Long et al. | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO WO 2012/129247 9/2012

OTHER PUBLICATIONS

Hung, J-W, "TANGO Capacitive Touch Controller IC", PIXCIR AG, Switzerland © 2008.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

\* cited by examiner

*Primary Examiner* — Olga Merkoulova
(74) *Attorney, Agent, or Firm* — Baker Botts LLP (57) ABSTRACT

The exemplary devices and processing techniques allow multiple measurement devices or chips to work together to sample a screen that is larger than one measurement device might sample, by allowing sharing X or drive lines amongst the measurements devices. Particular implementations of the subject matter described in this specification can be implemented so as to realize one or more of the following optional advantages. The sharing of the drive lines may allow for a screen sized or otherwise configured to have more measurement nodes than would be produced by the sum of the nodes that could be measured by the individual devices. For a screen that requires multiple measurement devices, the drive line sharing thus may allow use of a smaller number of measuring devices.

21 Claims, 13 Drawing Sheets

DELTA

MULTI-CHIP TOUCH SCREENS

TECHNICAL FIELD

The subject matter discussed herein relates to touch screen technologies, for example, to techniques for combining measuring devices, e.g. on multiple chips, for use with larger touch screens such as may have an arrangement of multiple touch screens or areas forming a large touch screen.

BACKGROUND

A position sensor is a device that can detect the presence and location of a touch, by a user's finger or by an object, such as a stylus, for example, within a display area of the position sensor display screen. In a touch sensitive display application, the position sensor enables a user to interact directly with what is displayed on the screen, rather than indirectly with a mouse or touchpad. Position sensors can be attached to or provided as part of computers, personal digital assistants (PDA), satellite navigation devices, mobile telephones, portable media players, portable game consoles, public information kiosks, and point of sale systems etc. Position sensors have also been used as control panels on various appliances.

There are a number of different types of position sensors/touch screens, such as resistive touch screens, surface acoustic wave touch screens, capacitive touch screens etc. A capacitive touch screen, for example, may include an insulator, coated with a transparent conductor in a particular pattern. When an object, such as a user's finger or a stylus, touches or is provided in close proximity to the surface of the screen there is a change in capacitance. This change in capacitance is sent to a controller for processing to determine the position of the touch.

An array of drive (in one example X) electrodes or lines and sense (in this example Y) electrodes or lines, of conductive material, can be used to form a touch screen having a plurality of nodes. A node is formed at each intersection of X and Y electrodes. Although referred to as an intersection, the electrodes cross but do not make electrical contact. Instead, the sense electrodes are capacitively coupled with the drive electrodes at the intersection nodes. Applying a voltage across the array of electrodes creates a grid of capacitors. When an object touches (contacts or comes in close proximity to) the surface of the screen, the capacitance change at every individual point on the grid can be measured to determine the location or position of the touch.

In recent years, it has become desirable for touch sensitive position sensors to be used in large screens. As touch screen size grows, the number of capacitive sensing nodes contained in a touch screen increases. To measure capacitance at more nodes on a screen requires increased measurement device capacity, either in the form of more complex measurement devices or chips or in the form of more measurement devices, to handle all the nodes of the larger screen size. A screen of four times the node count as could be handled by a particular size/capacity of measurement chip, for example, might use four measurement chips each measuring signals for a quarter of the touch screen. If the capacity of each measurement chip stays the same, large screens may require a very large number of measurement chips.

SUMMARY

The devices and processing techniques, discussed by way of examples below, allow multiple measurement devices or chips to work together to sample a screen that is larger than one measurement device might sample, by allowing sharing of the X or drive lines amongst the measurements devices. Particular examples described in this specification can be implemented so as to realize one or more of the following optional advantages. The sharing of the drive lines may allow for a screen sized or otherwise configured to have more measurement nodes than would be produced by the sum of those that could be measured by the individual devices. For a screen that requires multiple measurement devices, the drive line sharing thus may allow use of a smaller number of measuring devices.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

Figure 1:
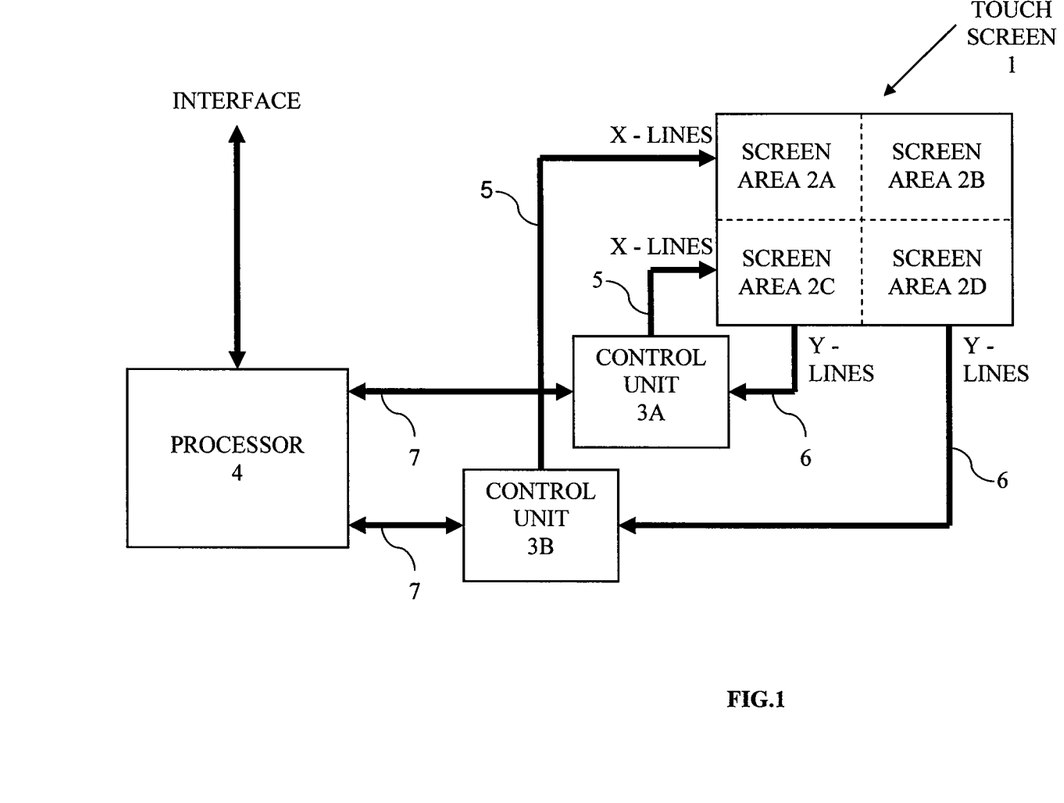
FIG. 1 illustrates an example of a large touch screen comprising four smaller screens or touch panel areas and associated measurement circuits or control units, where a number of the control units for measuring capacitance share the drive (X) lines.

Reference now is made in detail to the examples illustrated in the accompanying figures and discussed below. FIG. 1 schematically illustrates an example of a touch responsive position sensor. The sensor includes a screen or panel 1 for sensing touch and associated circuitry for driving and sensing lines of the screen to detect a touch and position of the touch on the screen 1.

In this first simple example, the overall touch screen 1 is formed of a 2×2 matrix of smaller touch screen areas 2. As such, the exemplary screen 1 includes four touch screen regions or areas 2A to 2D. The touch screen 1 has an array of sensing nodes formed at intersections of drive lines (horizontal X lines in the illustrated orientation) and sense lines (vertical Y lines in the illustrated orientation). A number of such nodes are included within each of the four touch screen regions or areas 2A to 2D. The X (drive) lines extend across all Y sense lines, for example, across both of the touch screen areas at the corresponding Y axis value. Similarly, the Y lines extend across all of the X lines, for example, across both of the touch screen areas at the corresponding X axis value.

If the screens were physically separated, they would be physically and electrically connected to form the larger panel. As part of the electrical connection, each line would be connected from one screen to a corresponding line in the next adjacent screen in the appropriate X or Y direction. If the screens are logically separate, that is to say regions or areas of a continuous larger screen, then the lines could run continuously across the regions forming the overall screen, in the respective X and Y directions.

The exemplary system for sensing touch and touch position on the screen 1 includes a number of control units. However, there are fewer control units than there are touch sensing areas 2 of the matrix of the touch screen 1. In the 2×2 matrix example of FIG. 1, there are two control units 3A and 3B. The system or device may also include a master control represented by the processor 4 in the example. A number of the X drive lines 5 connect to each of the control units 3A and 3B; and a number of the Y sense lines 6 connect to each of the control units 3A and 3B. Each control unit includes or may be a measuring device for measuring one or more parameters of signals at a number of nodes of the array of the touch screen 1 to determine a touch at or in the vicinity of the individual nodes the measurement device senses.

The processor 4 serving as the master control connects to the control units 3A, 3B via data leads 7. The processor 4, for example, processes touch detection data from the control units to identify the node or nodes at which touch is detected on the overall area of screen 1, based on timing of X line drive and sense line detection. Based on the node or nodes at which touch is detected, the processor 4 determines the position of each touch detected on the screen 1. The processor 4 may also provide control signals to the control units 3A and 3B over the data leads 7. In the example, the processor 4 also provides a higher level interface of the touch responsive position sensor to a system or device that uses the touch input information, for example, to a processor of a computer, personal digital assistant or mobile station.

The example uses only two control units 3A and 3B. Screens having more areas, lines and/or sensing nodes at the line intersections would use a larger number of control units; and examples of such screens and the attendant configuration control units are discussed later.

The example of FIG. 1 implements drive line sharing. Hence, each set of the drive lines is driven by only one measurement device/control unit, but all of the drive lines are shared across multiple measurement devices for sensing purposes. Each individual X line is driven by only one control unit, but all of the measurement devices sense signals at some number the nodes on the particular X line. However, any one measurement device senses signals at nodes via only an appropriate number or subset of the sense lines connected to the measurement device.

Each of the control units 3A and 3B drives and senses only the respective number of lines of each type within its design capacity. However, because the X drive lines extend across all Y sense lines, the X lines are shared by both of the control units 3A and 3B, in this first example. Each unit drives only the appropriate number of X lines. However, by synchronizing timing of the operations of the control units across the vertical sets of regions/lines (across the drive lines in the set of regions 2A-2B and in the set of regions 2C-2D), it becomes possible for each of the control units to sense touch at the Y lines that the respective unit connects to even when there is a touch at a crossing of an X line driven by the other control unit. In this way, the control units can work together to sample signals at the various nodes of a large screen 1 by the sharing of the X (drive) lines.

Hence, to facilitate the touch position detection, the control units 3A and 3B are synchronized. One or more of the drive (X) lines of each control unit may be used to synchronize the control units. In another example, the hardware of the control unit is configured to provide a separate synchronization component, freeing up all the drive (X) lines for actual use in touch sensing cycles. In another example, synchronization of the control units 3A, 3B, may be provided by the processor 4 via data lines 7.

In this way, each measurement device or control unit 3A or 3B is configured to drive a first number of but not all of the X drive lines 5 extending across at least two of the sensing areas in the first direction. Each measurement device or control unit 3A or 3B also is configured to sense signals relating to a touch at nodes of intersection with all of the X drive lines 5, via a second number of but not all of the sense lines 6 extending across at least two of the sensing areas 2A-2C or 2B-2D in the second direction. The measurement devices or control units 3A and 3B are configured to operate synchronously in a manner to identify one or more nodes, from among all nodes in all of the touch sensing areas 2A-2D of the matrix of the touch screen 1, as indication(s) of a position of a detected touch of the screen.

With that overview of a simple example, it may be helpful to consider touch sensing operations in somewhat more detail and then discuss a more complex example of the touch sensing with drive line sharing amongst measuring devices. Specific examples of the methodology will be discussed after the more complex panel example.

Figure 2:
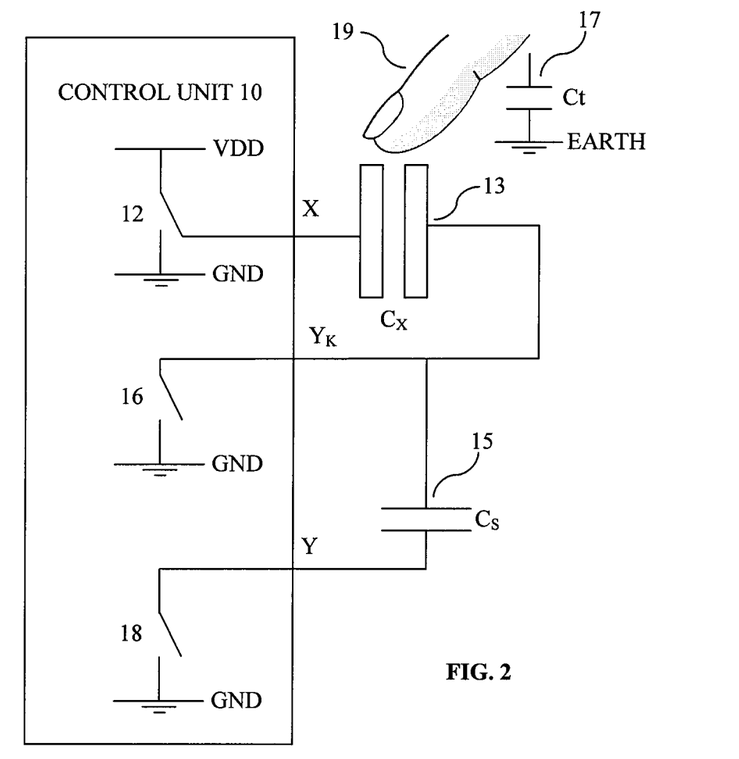
FIG. 2 schematically illustrates an example of an apparatus for detecting a touch.

FIG. 2 schematically illustrates an example of an apparatus for detecting a touch. The apparatus includes a control unit 10 provided with three switches 12, 16 and 18. Control unit 10 may be provided as a single integrated circuit chip such as a general purpose microprocessor, a microcontroller, a programmable logic device/array, an application-specific integrated circuit (ASIC), or a combination thereof. Switch 12 is provided between VDD and ground and is also connected to a sensor 13. The self coupling capacitance of the sensor 13 is $C_X$. The sensor 13 has two electrodes, an X (drive) electrode and a Y (sense) electrode. The apparatus measures the transverse coupling capacitance between the X and Y electrodes.

The sensor 13 is connected in series to a sampling capacitor 15 having a sampling capacitance $C_S$. The sampling capacitor 15 may have a sampling capacitance $C_S$ which is considerably larger than the sensor capacitance $C_X$. In one example, the sampling capacitance $C_S$ is at least 1000 times larger than the sensor capacitance $C_X$, where the sensor capacitance $C_X$ may be around 1 pF to 10 pF. The sampling capacitor 15 is also connected in series to the switches 16 and 18, both of which are connected to ground.

Capacitance C is a measure of the amount of electric charge stored for a given electric potential.

$$C = \frac{Q}{V}$$

Where V is the voltage between the plates and Q is charge.

Figure 3:
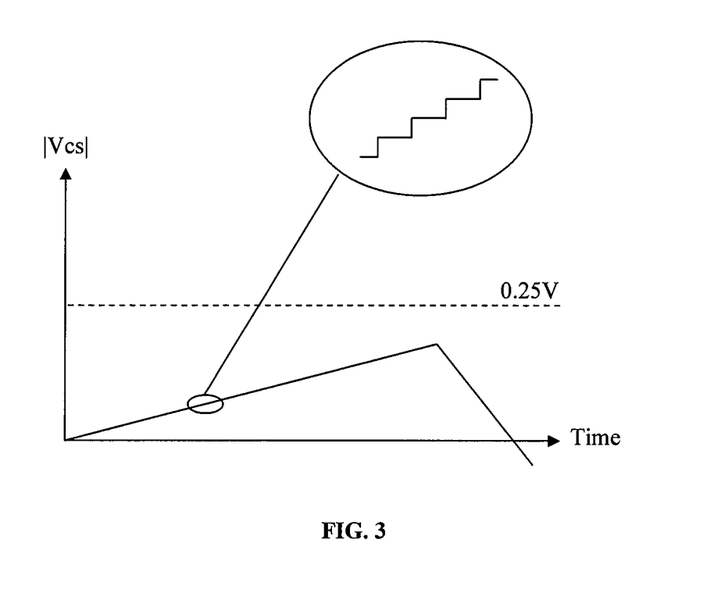
FIG. 3 illustrates an example of time that may be required to charge and discharge the apparatus of FIG. 2.

After opening switch 16, a voltage pulse is applied to the apparatus, by adjusting switch 12 to connect the sensor 13 to VDD, followed by closing switch 18 which causes charge to flow through $C_X$ into $C_S$, accumulating charge at $C_S$ and $C_S$. The sensor capacitance $C_X$ is then discharged, by, opening switch 18, closing switch 16 and adjusting switch 12 to connect to ground. Since only the sensor capacitance $C_X$ is discharged after each voltage pulse, the capacitance $C_S$ held at the sampling capacitor 15 is increased with each voltage pulse. This step wise increase is illustrated in FIG. 3, where $V_{CS}$ is the voltage accumulated at the sampling capacitor 15.

A predetermined number of voltage pulses is applied to the apparatus. After the predetermined number of pulses is applied to the apparatus, the capacitance $C_S$ accumulated in the sampling capacitor 15 is discharged. The time taken for the capacitance to discharge to a reference voltage is measured.

Figure 4:
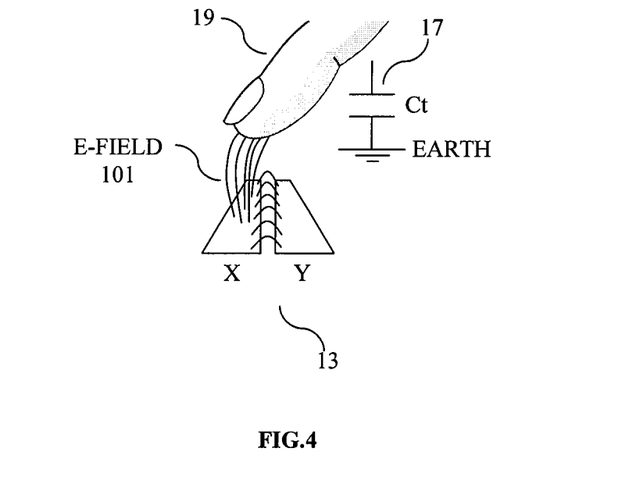
FIG. 4 illustrates an example of changes in an electric field when a finger is present.

As illustrated in FIG. 4, when a stylus or a user's finger 19, which has a touch capacitance to Earth $C_f$, is moved close to (or contacts) the sensor 13, the touch capacitance of the object diverts charge away from the drive electrode of $C_X$ to earth so that the capacitance $C_S$ accumulated in the sampling capacitor 15 with each voltage pulse is reduced. In one example, the sensor 13 is provided behind a dielectric panel so that the finger 19 does not directly contact the sensor 13. In another example, or in addition to a dielectric panel, the finger 19 may be provided in close proximity to the sensor 13, but not directly contacting the sensor 13.

Figure 5A:
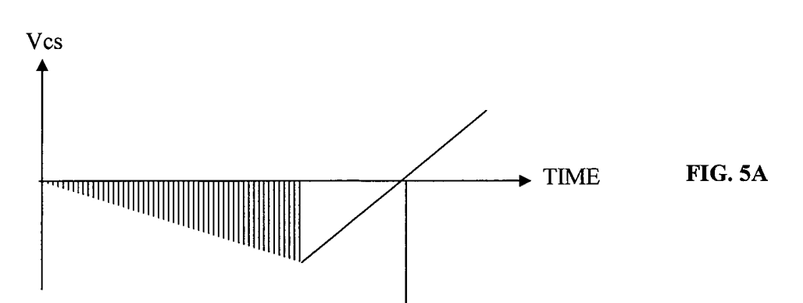
FIG. 5A illustrates an example of time that may be required to charge and discharge the apparatus of FIG. 2, when there is no touch.
Figure 5B:
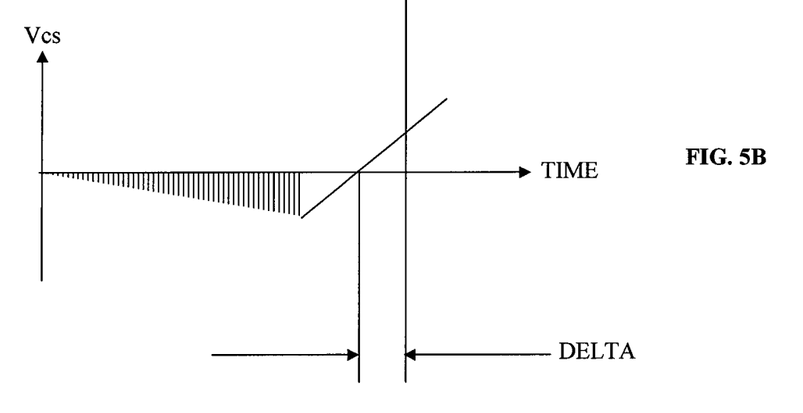
FIG. 5B illustrates an example of time that may be required to charge and discharge the apparatus of FIG. 2, when there is a touch.

FIG. 5A illustrates the voltage $V_{CS}$ accumulated at the sampling capacitor 15 after the predetermined number of pulses when there is no touch, and the time required to discharge the sampling capacitor 15. FIG. 5B illustrates the voltage $V_{CS}$ accumulated at the sampling capacitor 15 after the predetermined number of pulses when a user's finger 19 is close to or contacts the sensor 13 (i.e. when there is a touch), and the time required to discharge the sampling capacitor 15. Since the sampling capacitor 15 is connected to the negative side of the sensor 13, in the example of FIG. 2, the accumulated voltage $V_{CS}$ has a negative value.

As can be seen from FIGS. 5A and 5B, the voltage $V_{CS}$ accumulated in FIG. 5B is reduced when compared to the voltage $V_{CS}$ accumulated in FIG. 5A. In addition, the time required to discharge the sampling capacitor 15 in FIG. 5B is reduced when compared to the time required to discharge the sampling capacitor 15 in FIG. 5A. The reduction in time required to discharge the sampling capacitor 15 in FIG. 5B indicates that there is a touch. The difference between the time required to discharge the sampling capacitor 15 when there is no touch (illustrated in FIG. 5A) and the time required to discharge the sampling capacitor 15 when there is a touch (illustrated in FIG. 5B) is referred to as a delta.

The detection of a delta indicates a touch, because the delta indicates that there has been a change of charge accumulated at the sampling capacitor 15, when compared to the amount of charge expected to be accumulated at the sampling capacitor 15 when there is no touch.

Figure 6:
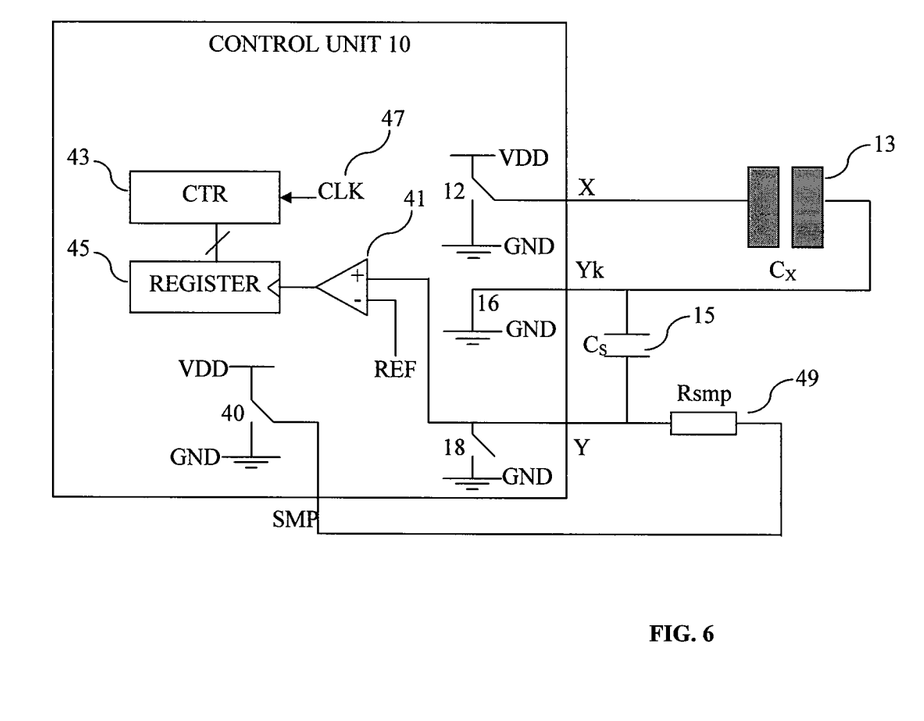
FIG. 6 illustrates schematically an example of a basic measurement circuit.

FIG. 6 illustrates a basic circuit for measuring the magnitude of Vcs. The control unit 10 of FIG. 2 includes a resistor 49, switch 40, a comparator 41, a register 45, a counter 43 and a clock signal 47. The resistor 49, comparator 41 and counter 43 are used to measure the magnitude of Vcs. The time required to discharge the sampling capacitor to a reference voltage is measured with the counter and the comparator, such that the counter value is the measurement.

Figure 7:
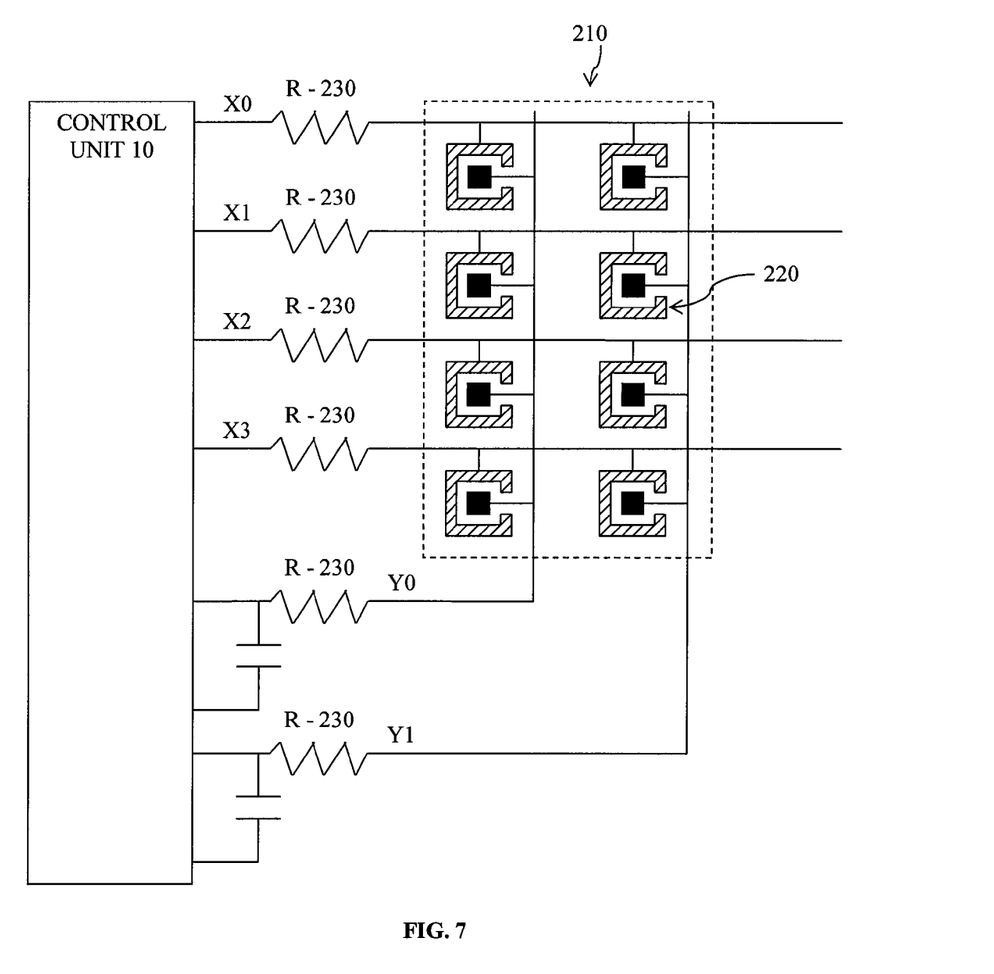
FIG. 7 illustrates schematically an example of a touch screen comprising a plurality of nodes and a control circuit for sensing position of a touch.

As illustrated in FIG. 7, in order to create a touch sensitive position sensor screen having more than one touch sensor 13, a plurality of drive and sense electrodes can be provided to create an array of sensing elements 220 (touch sensors 13) within a panel 210 of the position sensor. The drive electrodes (X) form one plate of each sensor 13 and the sense (Y) electrodes form the other plate of each sensor 13 having a capacitance $C_X$. The position sensor also includes a plurality of resistors 230, which may have different values, and a control unit 10. FIG. 7, illustrates one exemplary matrix of eight sensing elements 220, however many other configurations are possible.

The basic measuring circuit illustrated in FIG. 6 and described above is provided as an example only. Other methods of measuring a touch can be used.

The matrix of drive and sense electrodes forms a two-dimensional position sensor capable of sensing the position of a touch on the panel 210. The control unit 10 uses a scanning sequence through the rows of drive electrodes and the columns of sense electrodes to measure coupling capacitance at the intersections or nodes. Examples of position sensors include touch screens and touch pads, which can be provided attached to or as part of computers, personal digital assistants (PDA), satellite navigation devices, mobile phones, portable media players, portable game consoles, public information kiosks, and point of sale systems etc. Position sensors can also be used as control panels on various appliances.

Figure 8:
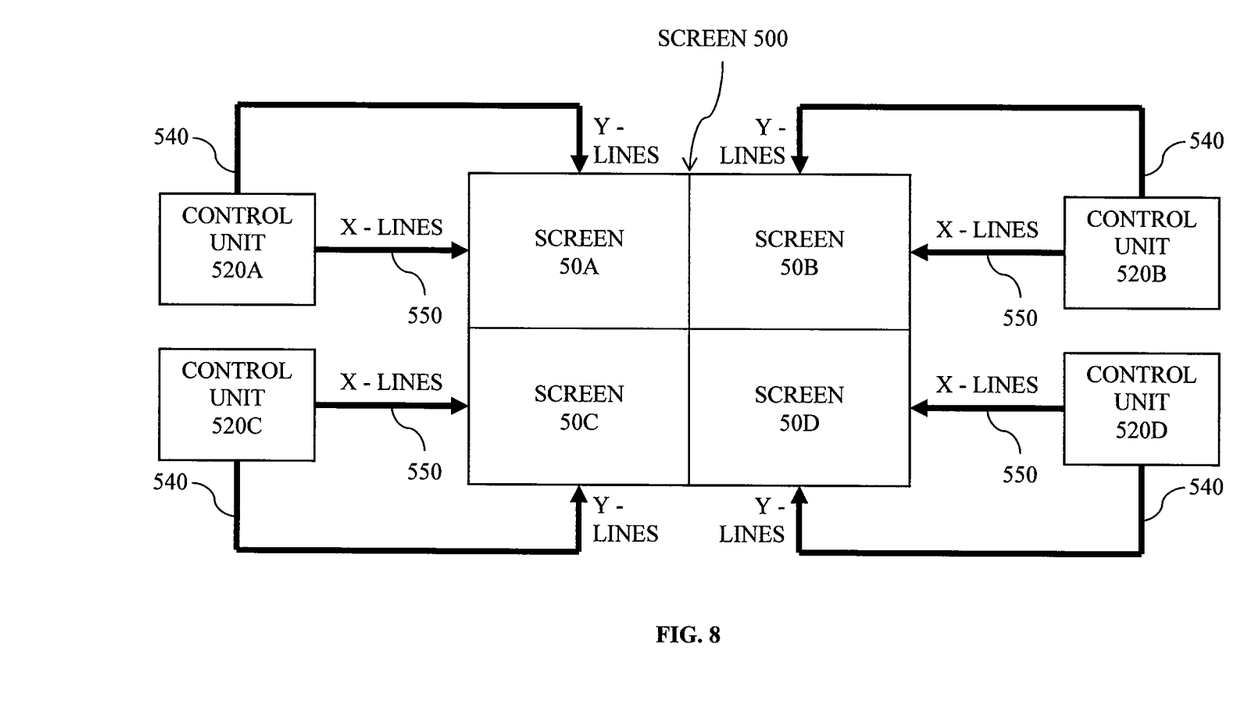
FIG. 8 schematically illustrates a large touch screen comprising four smaller screens or touch panel areas, with one control unit measuring capacitance at the nodes of each of the four smaller screens or touch panel areas.

FIG. 8 illustrates schematically four touch sensitive screens or regions, 50A, 50B, 50C and 50D, each having an array of sensing elements, arranged to create a large touch sensitive screen 500. Each of the screens or regions 50A to 50D is connected to a respective control unit 520A to 520D. Each control unit 520A to 520D drives the X electrode lines 550 of its respective screen 50A to 50D and samples the Y electrode lines 540 of its respective screen 50A to 50D. Therefore, each control unit 520A to 520D forms a measuring device capable of detecting a touch and the position thereof on its respective screen 50A to 50D which makes up a part of (a quarter in FIG. 8) the overall screen 500. Each control unit may be formed of a separate chip. In the arrangement of FIG. 8, each screen is logically or physically separated. In contrast to FIG. 1, the X lines and Y lines of FIG. 8 do not extend across the entire screen 500. Each screen 50A-50D has its own X lines and Y lines connected to its own control unit 520A to 520D.

Each control unit 520A to 520D drives and senses signals at nodes within the area 50A to 50D that it controls. In such an arrangement, the X lines may extend only across the region controlled by the respective unit. For example, the X drive lines 550 connected to the first control unit 520A extend only across the first screen or area 50A. Similarly, the X drive lines 550 connected to the second control unit 520B extend only across the second screen or area 50B. The X drive lines 550 connected to the third control unit 520C extend only across the third screen or area 50C; and the X drive lines 550 connected to the fourth control unit 520D extend only across the second screen or area 50D. Similarly, the sense lines extend only across the region controlled by the respective unit. Such an arrangement works much as if the areas 50A to 50D are actually separate screens.

Each control unit 520A to 520D is only capable of driving and sensing a predetermined number of nodes, which limits the number of nodes in each respective screen or region 50A to 50D. For example, each screen or area might have 10 X lines and 10 Y lines, and each control unit would be capable of driving/sensing 100 nodes. In another example, each screen might have 16 X lines and 14 Y lines, and each control unit would be capable of driving/sensing 224 nodes. Therefore in order to create and measure signals at nodes of a large touch screen 500, such as illustrated in FIG. 8, four times the size of a touch screen compatible with a single control unit chip of a particular capacity, having four times the number of nodes present in such a touch screen, four control units 520A to 520D are required in order to drive the large touch screen 500.

In order to create a large touch screen 500, for example nine times the size of a touch screen compatible with a single control unit chip of a particular capacity (e.g. a 3×3 touch screen), nine control units would be required. Furthermore, in order to create a large touch screen 500, for example sixteen times the size of the basic touch screen unit (e.g. a 4×4 touch screen), sixteen control units would be required. Consequently, very large touch screens require very large numbers of control units.

Figure 9:
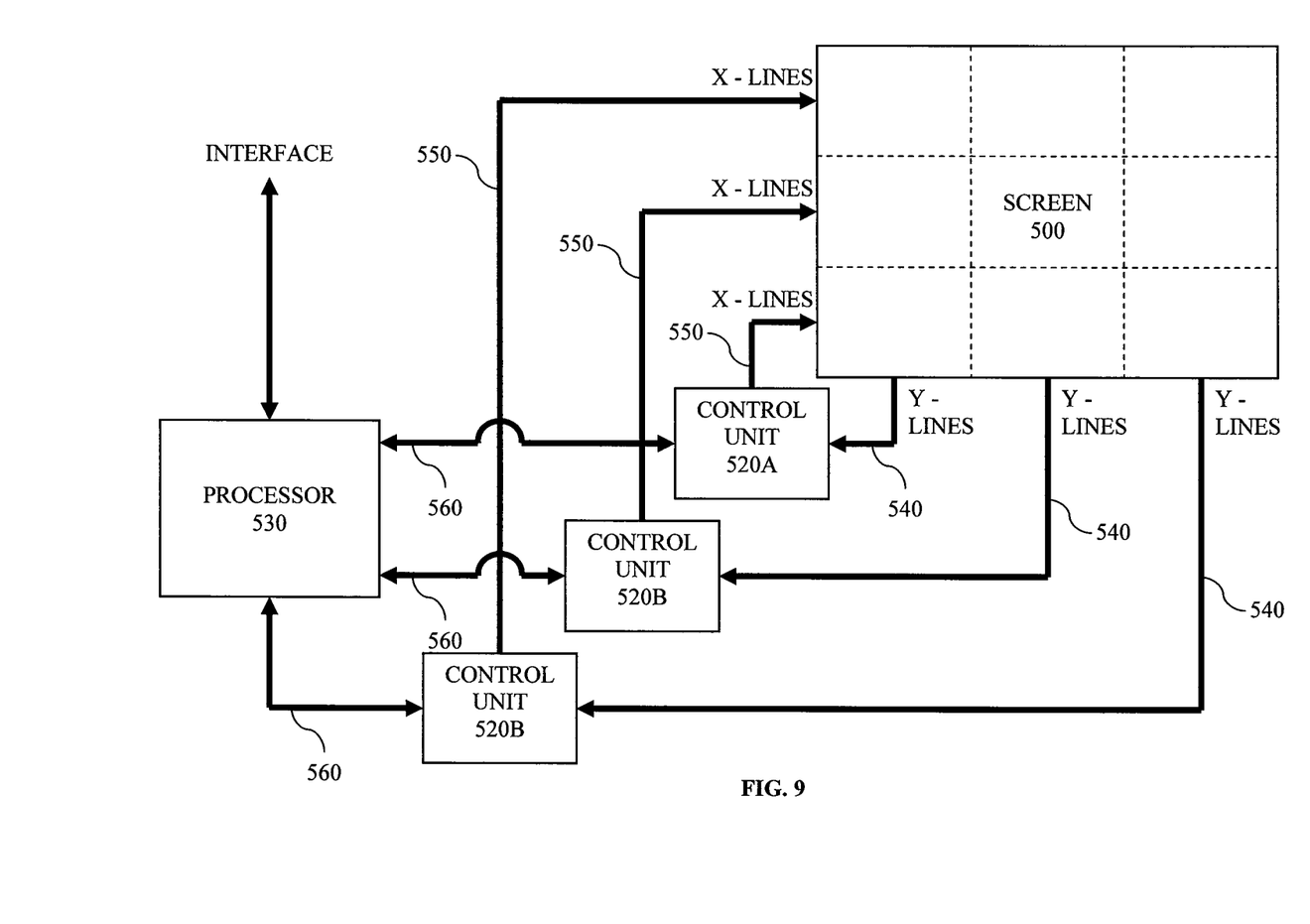
FIG. 9 schematically illustrates an example of a large touch screen and measurement circuit where a number of control units for measuring capacitance share the drive (X) lines.

FIG. 9 illustrates an example of an alternative arrangement for creating a large touch sensitive screen by using shared X (drive) lines to enable drive/sensing of the larger number of nodes without necessarily requiring so many control units. The X (drive) lines are shared in that they extend across all Y sense lines of the screen connected to all of the control units 520A to 520C. The exemplary large touch screen 500 of FIG. 9 has nine individual touch screens or touch screen areas of the particular unit size in a 3×3 matrix arrangement. In the arrangement of FIG. 9, the control units have been combined, so that fewer control units are required. The control units of FIG. 9 work together to sample the large screen 500 by sharing the X (drive) lines.

Figure 10:
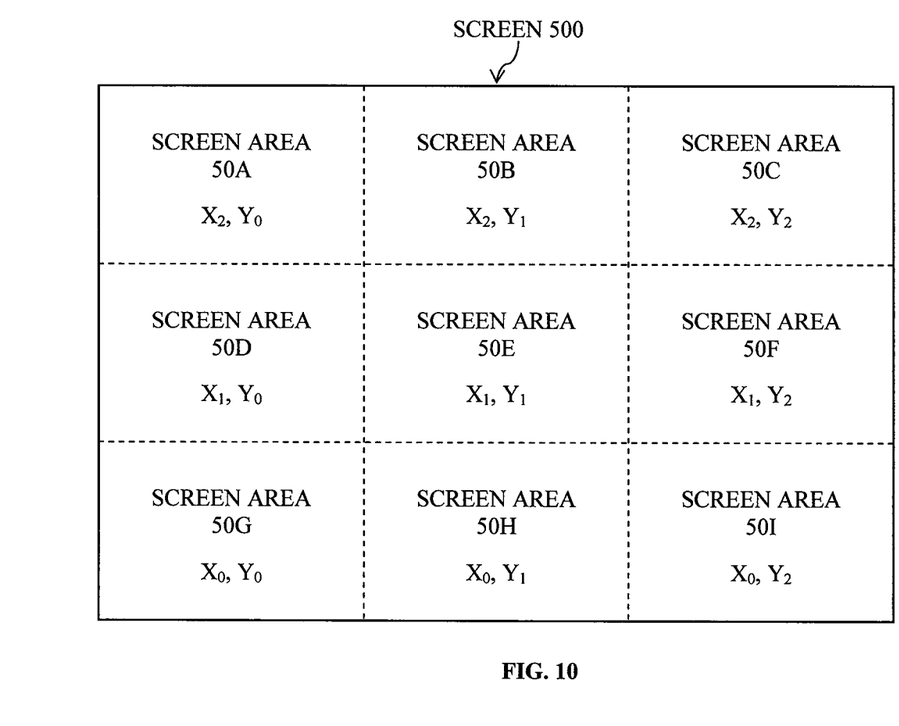
FIG. 10 illustrates schematically in more detail the example of a large touch screen having a number of screens or touch panel areas.

FIG. 10 illustrates the screen 500 of FIG. 9 in further detail. As can be seen from FIG. 10, the large screen 500 is divided into nine touch screen areas 50A to 50I each of a size (e.g. number of nodes) corresponding to the capacity of one control unit. In an arrangement, such as illustrated in FIG. 8, a separate control unit would measure signals from nodes in each screen area 50A to 50I. However, the arrangement of FIG. 9 enables each X line driven by one of the control units 520A, 520B, 520C to be sampled by the Y lines of all of the control units 520A, 520B, 520C. This allows for a screen size which is the sum of the X lines of all the control units times the sum of the Y lines of all the control units, but requiring fewer control units. In the arrangement of FIG. 8, it was not possible to sense signals at nodes along the X lines controlled by a first control unit with the Y lines of another control unit. Consequently, it would not be possible to detect screens 10A, 10B, 10D, 10F, 10H and 10I, since these combinations of X and Y lines would not exist.

The control units 520A, 520B and 520C are synchronized. In one example, at least one of the drive (X) lines of each control unit is used to synchronize the control units. In the example where a control unit is capable of driving/sensing 224 nodes, five of the X lines are used for synchronization, resulting in each screen area 50 having 11 X lines and 14 Y lines. In another example, the hardware of the control unit is configured such that a separate synchronization component is provided, freeing up all the drive (X) lines for sensing. In another example, synchronization of the control units may be provided by a processor 530, the processor 530 providing control signals 560 to each of the control units 520A, 520B, 520C.

Figure 13:
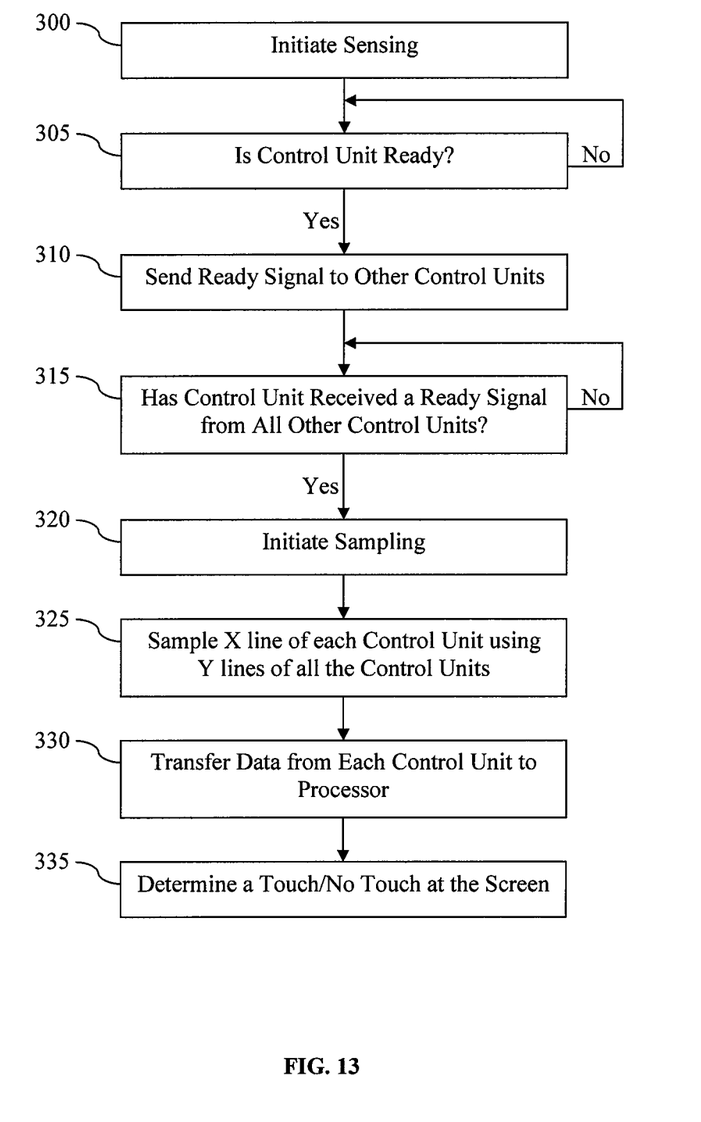
FIG. 13 illustrates an example of a method for combining control units for coordinated measurements on a large touch screen using drive line sharing.

FIG. 13 illustrates one method of detecting a touch using the arrangement of FIG. 9. As indicated in FIG. 13, the process is initiated at step 300. At step 305 it is determined at each control unit 520A, 520B and 520C whether that control unit is ready to begin sensing. If the control unit is not ready then the process waits until the unit is ready. When the control unit is ready, it sends a ready signal to each of the other control units at step 310. At step 315 it is determined whether the control unit has received a ready signal from all of the other control units in the system. If not, then the system waits until each control unit has received a ready signal from all of the other control units in the system. If a ready signal has been received from all of the other control units in the system, then the control units have been synchronized and are ready to begin sensing. The control units are synchronized before each sampling.

At step 320 sampling is initiated. At step 325 each X line is sampled using the Y lines associated with all the control units in the system. At any point in time, one control unit drives the X lines in the set connected to that unit. The control units that are not driving the X lines connected to those units at any given point in time provide a dummy sample, so that the X lines of the one control unit can be sampled by all the Y lines of all of the control units in the system.

Data signals 560 from each control unit 520A, 520B and 520C are transferred to a processor 530 at step 330. The processor 530 is provided for sensing a touch or a proximity of an object and determining its position on the overall screen based on the received sense signals. At step 335, the processor 530 processes all the data received from all of the control units 520A, 520B and 520C and determines if there has/has not been a touch at the touch screen 500. A processor 530 is used to process the data since each control unit 520A, 520B and 520C is not aware of the data produced by the other control units 520A, 520B and 520C. If a processor 530 was not used to process the data, then error readings would result at the edge of each screen area 50A to 50I. The processor 530 receives data from all the control unit 520A, 520B and 520C so is able to eliminate nonlinearities at the screen area 50A to 50I boundaries.

The processor 530 may be any known processor, such as a microcontroller, microprocessor or central processor.

The processor 530 is connected to an interface 570, which connects to the device in which the touch screen is provided.

In another example, the processor 530 is not required. Each control unit 520A, 520B, 520C may be provided with its own processor. In such an example, it is possible for all the data to be transferred to one of the control units 520A, 520B or 520C for processing at that control unit 520A, 520B or 520C. The data from all of the control units 520A, 520B, 520C is processed together at one of the control unit 520A, 520B or 520C to eliminate nonlinearities at the screen area 50A to 50I boundaries.

Figure 14:
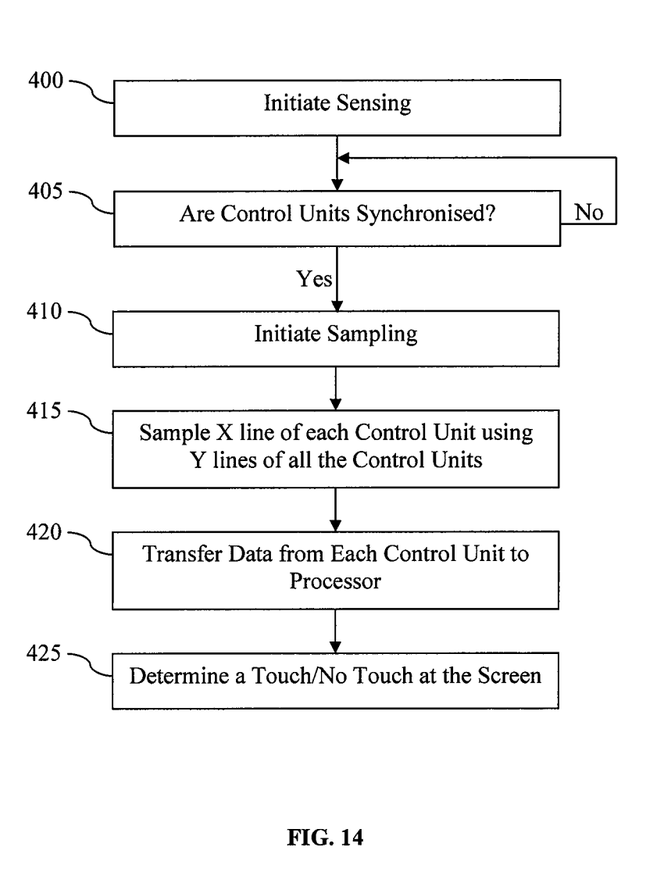
FIG. 14 illustrates another example of a method for combining control units for coordinated measurements on a large touch screen using drive line sharing.

FIG. 14 illustrates another method of detecting a touch using the arrangement of FIG. 9. As indicated in FIG. 14, the process is initiated at step 400. At step 405 it is determined whether all of the control units 520A, 520B and 520C have been synchronized. If all of the control units 520A, 520B and 520C have not been synchronized, then the process waits for the control units 520A, 520B and 520C to have been synchronized. If all of the control units 520A, 520B and 520C have been synchronized, then the process moves on to step 410. At step 410 sampling is initiated. At step 415 each X line is sampled using the Y lines associated with all the control units in the system. The control units that are not driving the X lines at any given point in time provide a dummy sample, so the X lines of one control unit can be sampled by all the Y lines of all of the control units in the system.

Data signals 560 from each control unit in the system are transferred to a processor 530 at step 420. Finally at step 425, the processor 530 processes all the data received from all of the control units 520A, 520B and 520C and determines if there has/has not been at touch at the touch screen 500.

The process of FIG. 14 can be utilized, for example, when a separate synchronization component is provided, or when the processor 530 controls synchronization of the control units 520A, 520B, 520C. The process of FIG. 14 can also be utilized, for example, when each control unit 520A, 520B, 520C is provided with its own processor. In such an example, all the data would be transferred to one of the control units 520A, 520B or 520C for processing at that control unit 520A, 520B or 520C.

Although the examples of FIGS. 9 and 10 were described with reference to a large touch screen 500, having a 3×3 arrangements, the present subject matter may also be utilized to create a large touch screen 500 having a 2×2 arrangement like that of FIG. 1, requiring two control units; a 4×4 arrangement, requiring four control units; a 5×5 arrangement, requiring five control units etc. The drive line sharing technologies may also be utilized to create a large touch screen 500 having a 2×4 arrangement, 3×4 arrangement etc. as required. In such an arrangement, the touch screen would require four control units. The control units that are not driving the X lines, or Y lines as appropriate may provide a dummy sample instead.

Figure 11:
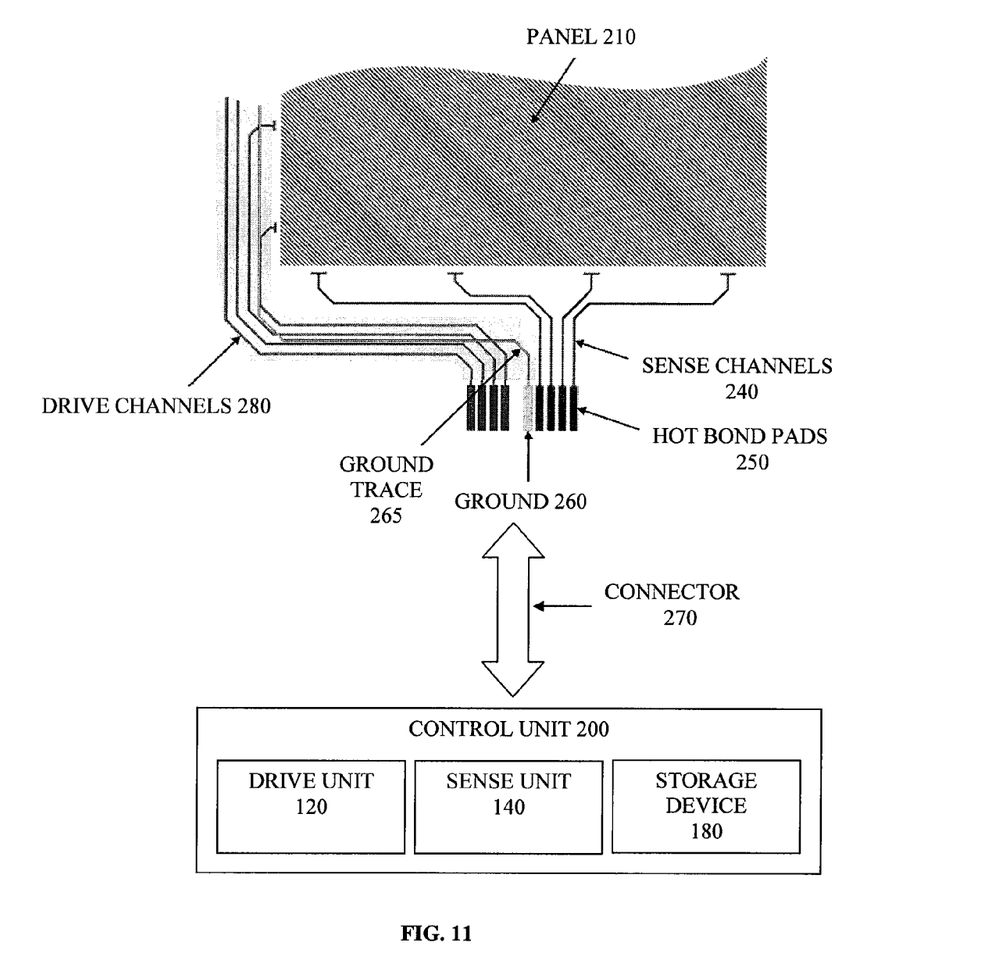
FIG. 11 illustrates schematically an example of a connection of a panel or a portion thereof to a control unit.

FIG. 11 illustrates schematically a panel 210 including a plurality of drive (X) electrode lines (not illustrated) connected to drive channels 280 and a plurality of sense (Y) electrode lines (not illustrated) connected to sense channels 240. The drive channels 280 and the sense channels 240 are connected to a control unit 200 via a connector 270. The connector 270 may be a conductive trace or a feed-through.

The control unit 200 includes a drive unit 120 for supplying drive signals to the drive electrodes, and a sense unit 140 for sensing signals from the sense electrodes. The control unit 200 thus controls the operation of the drive and sense units 120, 140. The control unit 200 may also include a storage device 180, such as a computer readable medium.

Although the drive unit 120, and sensing unit 140 are illustrated as separate components in FIG. 11, the functionality of these units may be provided in a single integrated circuit chip such as a general purpose microprocessor, a microcontroller, a field programmable gate array (FPGA) or an application specific integrated circuit (ASIC). In addition, a separate drive unit may be provided for each drive channel connected to each electrode.

Figure 12:
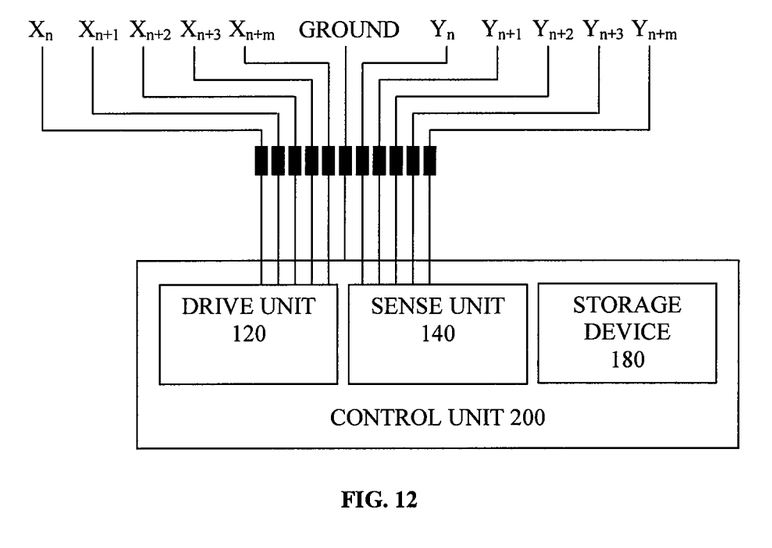
FIG. 12 illustrates schematically in more detail the example of a connection of a panel to a control unit.

As illustrated in FIG. 12 the drive channels Xn, Xn+1, Xn+2, . . . Xn+m are connected to the drive unit 120, although in one example, each drive channel is connected to a separate drive unit 120. In addition, the sense channels Yn, Yn+1, Yn+2, . . . Yn+m are connected to the sense unit 140.

In another example, not illustrated, separate drive and sense control units may be provided. In this instance, a drive control units may include a drive unit and a storage device, and a sense control units may include a sense unit and a storage device. If a large touch screen 500 having a 2×4 arrangement etc. is provided, then it may be advantageous to use two drive control units and four sense control units etc.

The above examples show that the drive line sharing approach provides an efficient technique to scale the electronics to measure more nodes on larger touch panels. The first example used two control units to perform drive and sensing on a 2×2 matrix touch panel. The second example used three control units to perform drive and sensing on a 3×3 matrix touch panel. A similar approach can be used for larger and larger square matrix panels, with one additional control unit/ measuring device for each additional row/column. However, those skilled in the art will recognize that the shared drive line strategy to scaling the number of control units also may be adapted to panel configurations that utilize different numbers of screens or areas in the different panel dimensions. For example, each control unit might handle less than its full capacity of drive or sense lines but handle its full capacity of the other type of lines. Alternatively, one controller might only drive a set of X lines for a row of regions or only sense a set of Y lines for a column of regions.

The position sensors described above can be attached to numerous electronic devices, such as computers, personal digital assistants (PDA), satellite navigation devices, mobile phones, portable media players, portable game consoles, public information kiosks, point of sale systems etc. These electronic devices may include a central processor or other processing device for executing program instructions, an internal communication bus, various types of memory or storage media (RAM, ROM, EEPROM, cache memory, disk drives etc.) for code and data storage, and one or more network interface cards or ports for communication purposes.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

What is claimed is:

1. An apparatus comprising:
  a touch screen comprising:
    a plurality of drive lines that each extend across one or more portions of the touch screen in a first direction;
    a plurality of sense lines that each extend across one or more portions of the touch screen in a second direction; and
  a plurality of measurement devices that are each operable to drive one or more of the drive lines and to sense one or more of the sense lines, each of the drive lines being driven by only one of the measurement devices when operating, each of the sense lines being sensed by only one of the measurement devices when operating, each of the measurement devices when operating driving only some of the drive lines, each of the measurement devices when operating sensing only some of the sense lines, and when sensing one of its sense lines each of the measurement devices sensing, for each of the drive lines, a capacitance between the drive line and the one of its sense lines.

2. The apparatus of claim 1, further comprising a processor operable to determine a position of a detected touch on the touch screen in response to data from all of the measurement devices.

3. The apparatus of claim 2, wherein the processor is further operable to provide signals to the measurement devices to synchronize operations of the measurement devices.

4. The apparatus of claim 1, wherein each respective one of the measurement devices is further operable to provide a synchronization signal over at least one of the drive lines connected to the respective measurement device and to respond to a synchronization signal from another respective one of the measurement devices, to enable synchronous operations of the measurement devices.

5. The apparatus of claim 1, wherein the touch screen comprises a plurality of touch-sensing areas.

6. The apparatus of claim 2, wherein the processor is operable to determine a position of a detected touch based at least in part on drive line timing data and sense line detection data.

7. One or more computer-readable non-transitory storage media embodying logic that is operable when executed to:
  drive with a plurality of measurement devices a plurality of drive lines of a touch screen, each of the drive lines extending across one or more portion of the touch screen in a first direction; and
  sense a plurality of sense lines of a touch screen, each of the sense lines extending across one or more portion of the touch screen in a second direction;
  each of the drive lines being driven when operating by only one of the measurement device;
  each of the sense lines being sensed when operating by only one of the measurement devices;
  each of the measurement devices when operating driving only some of the drive lines and sensing only some of the sense lines but when sensing one of its sense lines, sensing, for each of the drive lines, a capacitance between the drive line and the one of its sense lines.

8. The media of claim 7, wherein the logic is further operable when executed to determine a position of a detected touch on the touch screen in response to data from all of the measurement devices.

9. The media of claim 8, wherein the logic is further operable when executed to provide signals to the measurement devices to synchronize operations of the measurement devices.

10. The media of claim 7, wherein each respective one of the measurement devices is further operable to provide a synchronization signal over at least one of the drive lines connected to the respective measurement device and to respond to a synchronization signal from another respective one of the measurement devices, to enable synchronous operations of the measurement devices.

11. The media of claim 7, wherein the touch screen comprises a plurality of touch-sensing areas.

12. A method comprising:
  driving with a plurality of measurement devices a plurality of drive lines of a touch screen, each of the drive lines extending across one or more portion of the touch screen in a first direction; and
  sensing a plurality of sense lines of a touch screen, each of the sense lines extending across one or more portion of the touch screen in a second direction;
  each of the drive lines being driven by only one of the measurement device;
  each of the sense lines being sensed by only one of the measurement devices;
  each of the measurement devices driving only some of the drive lines and sensing only some of the sense lines but when sensing one of its sense lines, sensing, for each of the drive lines, a capacitance between the drive line and the one of its sense lines.

13. The method of claim 12, wherein the touch screen comprises a plurality of touch-sensing areas.

14. The method of claim 12, wherein the touch screen further comprises a synchronization component that controls the synchronization of the plurality of measurement devices.

15. The method of claim 14, wherein a processor controls synchronization of the plurality of measurement devices.

16. The method of claim 15, wherein the processor resides on one of the plurality of measurement devices.

17. The method of claim 14, further comprising, at each measurement device:
  sending a synchronization signal over at least one of the drive lines driven by the measurement device; and
  receiving a synchronization signal from at least one other measurement device in the plurality of measurement devices.

18. The method of claim 15, wherein the processor is connected to an interface.

19. The method of claim 12, further comprising determining a position of a detected touch on the touch screen in response to data from all of the measurement devices.

20. The method of claim 15, wherein the processor is further operable to provide signals to the measurement devices to synchronize operations of the measurement devices.

21. An apparatus comprising:
  a first measurement device operable to:
    drive at least one of a plurality of drive lines that each extend across one or more portions of a touch screen in a first direction; and
    sense at least one of a plurality of sense lines that each extend across one or more portions of the touch screen in a second direction; and
  a second measurement device operable to:
    drive at least one of the plurality of drive lines; and
    sense a sense line of the plurality of sense lines by measuring a capacitance between the sense line and a drive line driven by the first measurement device.

* * * * *